United States Patent
Diamond et al.

(10) Patent No.: US 11,473,536 B2
(45) Date of Patent: Oct. 18, 2022

(54) PORT-BASED EVAPORATIVE EMISSIONS CAPTURE

(71) Applicant: Ford Global Technologies, LLC, Dearborn, MI (US)

(72) Inventors: Brendan Diamond, Grosse Pointe, MI (US); Jim Stevens, Belleville, MI (US); David Guglielmo, Northville, MI (US); Kenneth Middleton, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 116 days.

(21) Appl. No.: 17/027,246

(22) Filed: Sep. 21, 2020

(65) Prior Publication Data

US 2022/0090565 A1    Mar. 24, 2022

(51) Int. Cl.
| | |
|---|---|
| *F02M 25/08* | (2006.01) |
| *F02M 35/10* | (2006.01) |
| *F02D 41/00* | (2006.01) |
| *F01N 13/10* | (2010.01) |

(52) U.S. Cl.
CPC ........... *F02M 25/089* (2013.01); *F01N 13/10* (2013.01); *F02D 41/003* (2013.01); *F02D 41/009* (2013.01); *F02M 35/10222* (2013.01); *F02D 2200/0404* (2013.01)

(58) Field of Classification Search
CPC ............. F02M 25/089; F02M 25/0872; F02M 35/10222; F02M 35/10281; F02D 41/0025; F02D 41/003; F01N 3/0835
See application file for complete search history.

(56) References Cited

U.S. PATENT DOCUMENTS

| | | | | |
|---|---|---|---|---|
| 3,001,519 A | * | 9/1961 | Dietrich | F02M 25/0836 123/519 |
| 4,208,997 A | * | 6/1980 | Yoshida | F02M 25/089 123/519 |
| 5,207,734 A | * | 5/1993 | Day | F01N 3/0878 96/135 |
| 6,736,115 B1 | * | 5/2004 | Leffel | F02M 25/0854 220/722 |
| 7,107,759 B2 | * | 9/2006 | Annoura | F02D 41/0032 123/518 |
| 2002/0096148 A1 | * | 7/2002 | Trumpy | F02M 33/02 123/519 |

(Continued)

OTHER PUBLICATIONS

"2019 My OBD System Operation Summary for Gasoline Engines," Ford Service Content Website, Available Online http://www.fordservicecontent.com/ford_content/catalog/motorcraft/OBDSM1900.pdf, Available as Early as Oct. 24, 2017, 385 pages.

*Primary Examiner* — Phutthiwat Wongwian
*Assistant Examiner* — Anthony L Bacon
(74) *Attorney, Agent, or Firm* — Vincent Mastrogiacomo; McCoy Russell LLP

(57) ABSTRACT

Methods and systems are provided for reducing evaporative emissions from a vehicle. In one example, the vehicle may include a system for capturing emissions including a plurality of vacuum ports coupled to a vacuum source. The plurality of vacuum ports may be disposed in vehicle components prone to emitting hydrocarbon vapors and activation of the vacuum source draws the vapors from the vehicle components to a fuel canister where the evaporative emissions are stored until the fuel canister is purged.

17 Claims, 4 Drawing Sheets

(56) References Cited

U.S. PATENT DOCUMENTS

| | | | |
|---|---|---|---|
| 2016/0084175 A1* | 3/2016 | Dudar | F02M 25/0818 |
| | | | 123/519 |
| 2016/0215711 A1* | 7/2016 | Dudar | F02D 41/004 |
| 2016/0319718 A1* | 11/2016 | Dudar | F02M 25/089 |
| 2017/0198671 A1* | 7/2017 | Dudar | F02M 35/104 |
| 2017/0260914 A1* | 9/2017 | Dudar | F02M 25/0854 |

* cited by examiner

PORT-BASED EVAPORATIVE EMISSIONS CAPTURE

FIELD

The present description relates generally to methods and systems for reducing engine emissions.

BACKGROUND/SUMMARY

Increasingly stringent emissions standards have motivated innovative efforts to reduce and/or capture gases generated during fuel combustion. While low emissions vehicles, such as hybrid electric and all-electric vehicles, may be appealing alternatives to conventional combustion-powered vehicles, certain internal combustion engine (ICE) vehicles may remain desirable for specific applications. For example, heavy-duty and performance vehicles fully powered by internal combustion engines may not be readily replaced by partial or fully electric power systems. Thus, consumer markets may demand continued production of such fuel combusting vehicles.

Emissions standards address required reduction in evaporative hydrocarbon emissions for ICE powered vehicles. In some examples, a large portion of the vehicle emissions may be released from reservoirs such as an air induction system (AIS), an intake manifold, an exhaust manifold, etc. Implementing emissions reduction strategies which target specific vehicle components may thus enable regulations to be met in a cost efficient manner. Furthermore, development of technologies that preclude reconfiguration of engine components may be desirable.

In one example, as described herein, the above issues may be at least partially addressed by a system for capturing evaporative emissions, including a plurality of vacuum ports disposed in hydrocarbon-emitting components of a vehicle, the plurality of vacuum ports fluidically coupled to a vacuum source configured to evacuate the hydrocarbon-emitting components and route evacuated evaporative emissions to an engine of the vehicle. In this way, emissions may be efficiently reduced at low cost.

As one example, the plurality of vacuum ports may be disposed in vehicle components such as the AIS, intake manifold, exhaust manifold, and other regions of an engine system prone to releasing hydrocarbon vapors. When the engine is off, the vacuum source may be activated to draw evaporative emissions from the components and deliver the emissions to a fuel canister of the vehicle. The emissions may be stored at the fuel canister until subsequent engine operation during which the fuel canister may be purged and the emission combusted at the engine. The system may be readily adapted to a variety of vehicles with ICEs during production stages as well as to already existing engine systems. As a result, compliance with emissions standards may be enabled for fuel-combusting vehicles.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
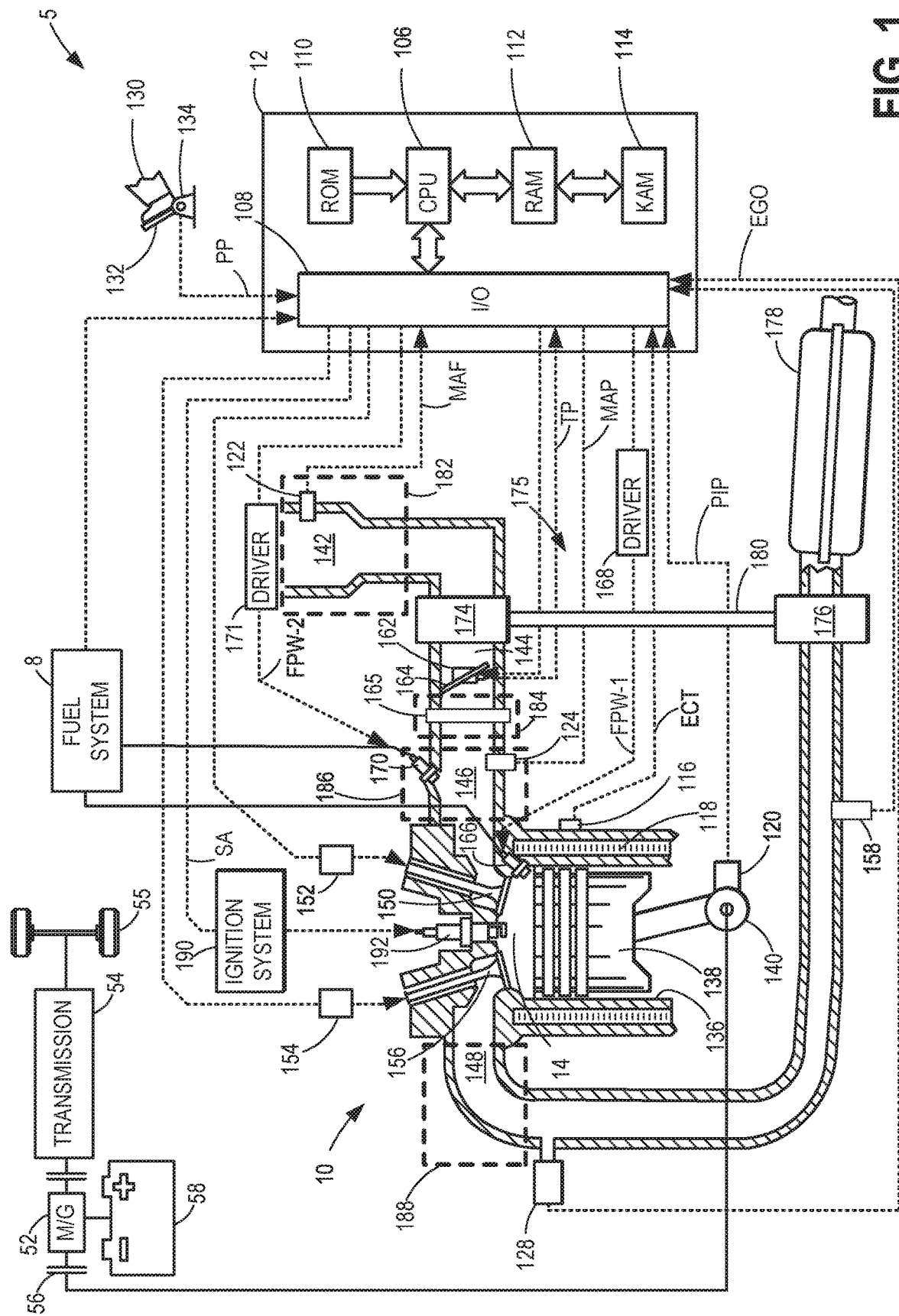
FIG. 1 shows an example of an engine system with regions contributing to evaporative emissions indicated.
Figure 2:
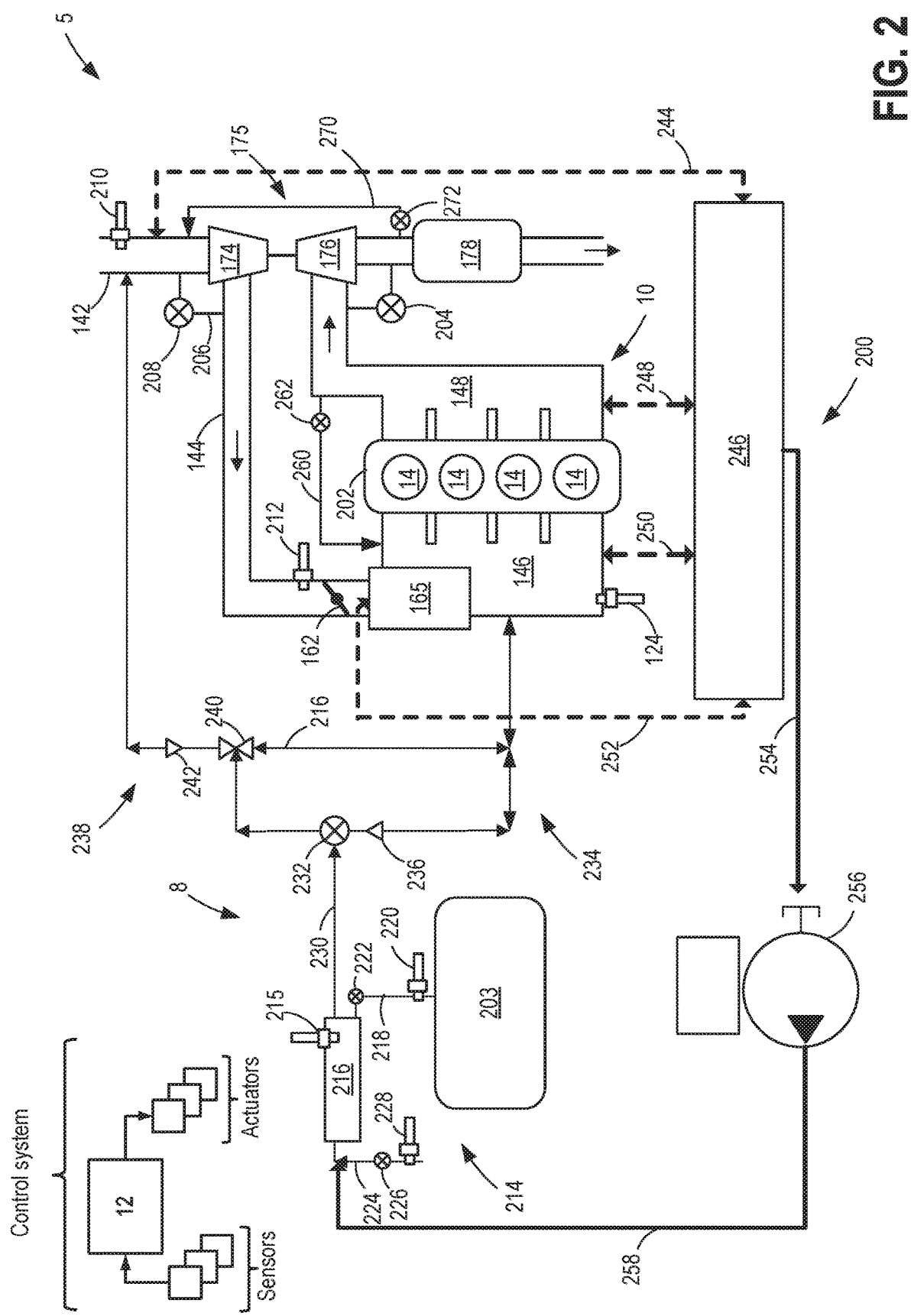
FIG. 2 shows the engine system with a fuel vapor purge system in which a port-based emissions capture system is implemented.
Figure 3:
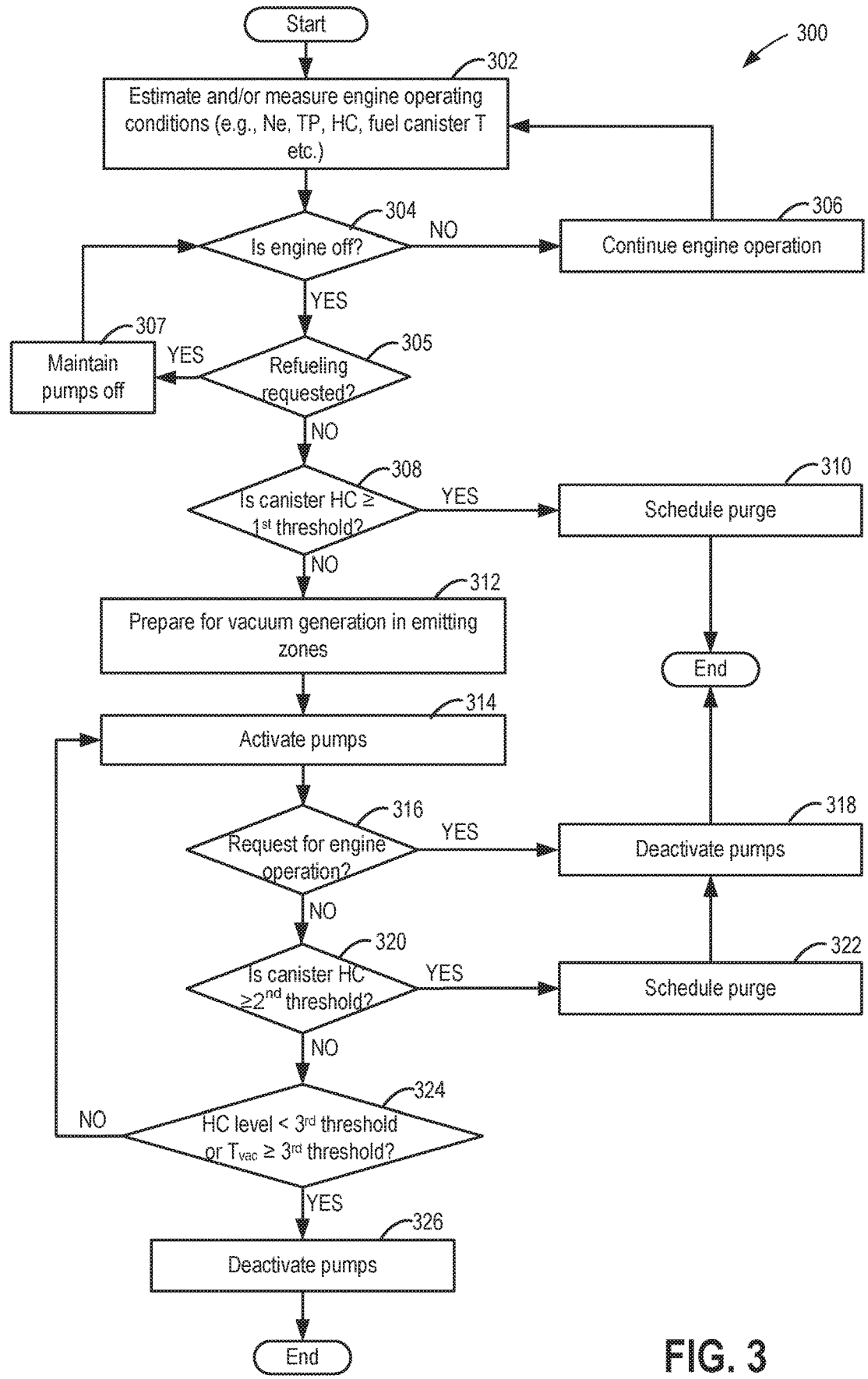
FIG. 3 shows an example of a method for reducing engine emissions using the port-based emissions capture system.
Figure 4:
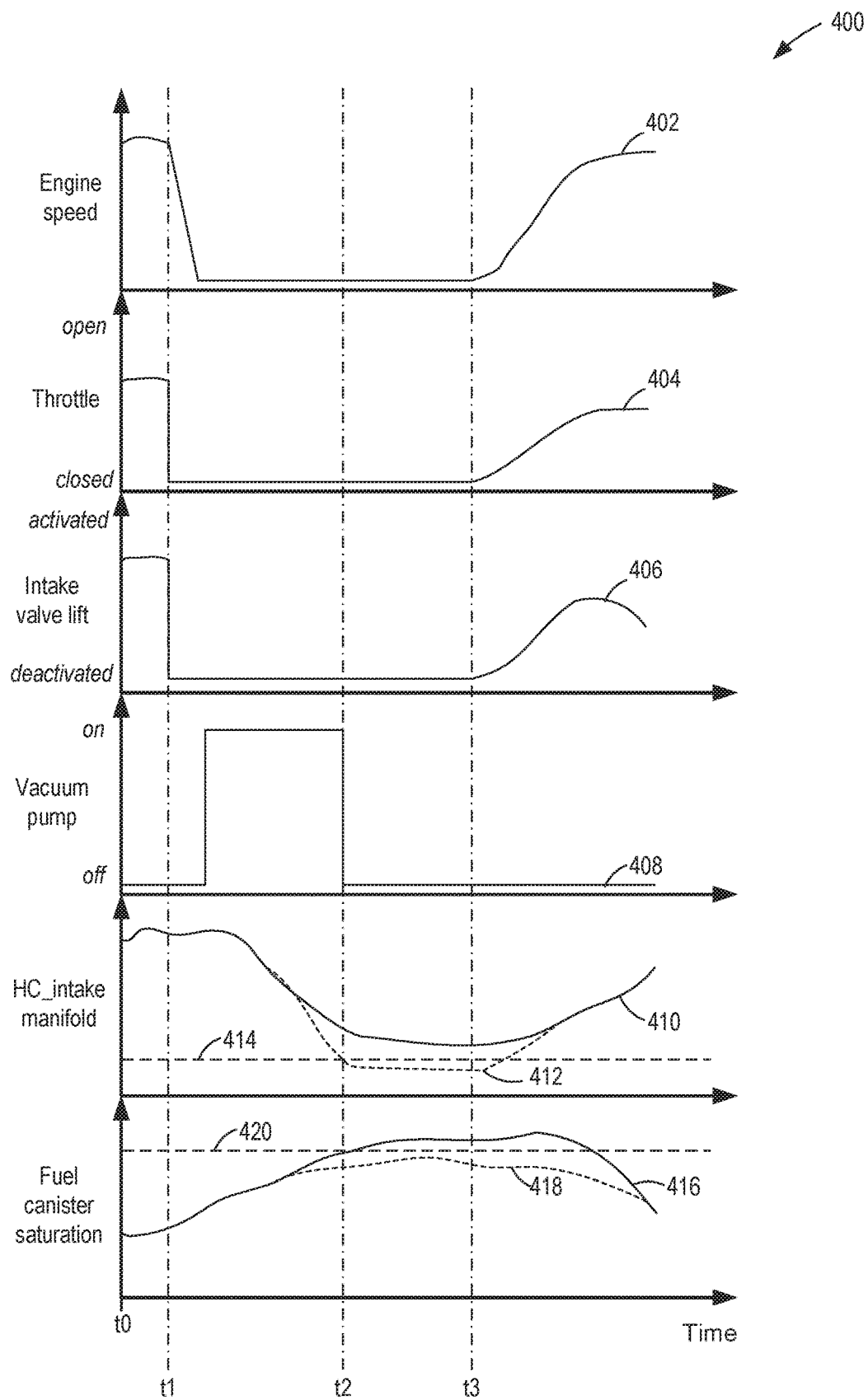
FIG. 4 shows examples of operations performed during application of the port-based emissions capture system to reduce emissions.

The following description relates to systems and methods for reducing evaporative emissions from an engine system. The engine system may include an internal combustion engine (ICE) configured to combust a mixture of fuel and air, resulting in generation of burnt gases, unburnt gases, and other combustion by-products. An example of the ICE is shown in FIG. 1. At least a portion of the evaporative emissions may be trapped via a port-based emissions capture (PBEC) system. The PBEC system may include ports to couple various engine components to a vacuum pump. The vacuum pump may capture emissions generated at the engine components and direct the emissions to a fuel vapor purge (FVP) system coupled to the engine. The engine of FIG. 1, including the FVP system, is shown in FIG. 2 with the PBEC system coupled to regions of the engine prone to emitting evaporative hydrocarbons. A routine for capturing and reducing emissions via the PBEC system is shown in FIG. 3. Examples of vehicle operations which may be conducted during use of the PBEC system to capture emissions are illustrated in FIG. 4.

Turning now to FIG. 1, an example of a cylinder 14 of an internal combustion engine 10 is illustrated, which may be included in a vehicle 5. Engine 10 may be controlled at least partially by a control system, including a controller 12, and by input from a vehicle operator 130 via an input device 132. In this example, input device 132 includes an accelerator pedal and a pedal position sensor 134 for generating a proportional pedal position signal PP. Cylinder (herein, also "combustion chamber") 14 of engine 10 may include combustion chamber walls 136 with a piston 138 positioned therein. Piston 138 may be coupled to a crankshaft 140 so that reciprocating motion of the piston is translated into rotational motion of the crankshaft. Crankshaft 140 may be coupled to at least one drive wheel 55 of the passenger vehicle via a transmission 54, as described further below. Further, a starter motor (not shown) may be coupled to crankshaft 140 via a flywheel to enable a starting operation of engine 10.

In some examples, vehicle 5 may be a hybrid vehicle with multiple sources of torque available to one or more vehicle wheels 55. In other examples, vehicle 5 is a conventional vehicle with only an engine. In the example shown, vehicle 5 includes engine 10 and an electric machine 52. Electric machine 52 may be a motor or a motor/generator. Crankshaft 140 of engine 10 and electric machine 52 are connected via transmission 54 to vehicle wheels 55 when one or more clutches 56 are engaged. In the depicted example, a first clutch 56 is provided between crankshaft 140 and electric machine 52, and a second clutch 56 is provided between electric machine 52 and transmission 54. Controller 12 may send a signal to an actuator of each clutch 56 to engage or disengage the clutch, so as to connect or disconnect crankshaft 140 from electric machine 52 and the components connected thereto, and/or connect or disconnect electric machine 52 from transmission 54 and the components connected thereto. Transmission 54 may be a gearbox, a planetary gear system, or another type of transmission. The powertrain may be configured in various manners including as a parallel, a series, or a series-parallel hybrid vehicle.

Electric machine 52 receives electrical power from a traction battery 58 to provide torque to vehicle wheels 55. Electric machine 52 may also be operated as a generator to provide electrical power to charge battery 58, for example, during a braking operation.

Cylinder 14 of engine 10 can receive intake air via an air induction system (AIS), including a series of intake air passages 142, 144, and intake manifold 146. Intake manifold 146 can communicate with other cylinders of engine 10 in addition to cylinder 14, as shown in FIG. 2. In some examples, one or more of the intake passages may include a boosting device, such as a turbocharger or a supercharger. For example, FIG. 1 shows engine 10 configured with a turbocharger 175, including a compressor 174 arranged between intake passages 142 and 144 and an exhaust turbine 176 arranged along an exhaust manifold 148. Compressor 174 may be at least partially powered by exhaust turbine 176 via a shaft 180 when the boosting device is configured as a turbocharger. However, in other examples, such as when engine 10 is provided with a supercharger, compressor 174 may be powered by mechanical input from a motor or the engine and exhaust turbine 176 may be optionally omitted.

A throttle 162 including a throttle plate 164 may be provided in the engine intake passages for varying the flow rate and/or pressure of intake air provided to the engine cylinders. For example, throttle 162 may be positioned downstream of compressor 174, as shown in FIG. 1, or may be alternatively provided upstream of compressor 174. A charge air cooler (CAC) 165 may be positioned downstream of throttle 162 and upstream of intake manifold 146. In this way, the CAC 165 may cool and increase a power density of intake air prior to combustion. While the CAC 165 is depicted downstream of throttle 162 in FIG. 1, other examples may include positioning CAC 165 upstream of throttle 162.

Exhaust manifold 148 can receive exhaust gases from other cylinders of engine 10 in addition to cylinder 14. An exhaust gas sensor 128 is shown coupled to exhaust manifold 148 upstream of an emission control device 178. Exhaust gas sensor 128 may be selected from among various suitable sensors for providing an indication of exhaust gas air/fuel ratio (AFR), such as a linear oxygen sensor or UEGO (universal or wide-range exhaust gas oxygen), a two-state oxygen sensor or EGO (as depicted), a HEGO (heated EGO), a NOx, a HC, or a CO sensor, for example. Emission control device 178 may be a three-way catalyst, a NOx trap, various other emission control devices, or combinations thereof.

Each cylinder of engine 10 may include one or more intake valves and one or more exhaust valves. For example, cylinder 14 is shown including at least one intake poppet valve 150 and at least one exhaust poppet valve 156 located at an upper region of cylinder 14. In some examples, each cylinder of engine 10, including cylinder 14, may include at least two intake poppet valves and at least two exhaust poppet valves located at an upper region of the cylinder. Intake valve 150 may be controlled by controller 12 via an actuator 152. Similarly, exhaust valve 156 may be controlled by controller 12 via an actuator 154. The positions of intake valve 150 and exhaust valve 156 may be determined by respective valve position sensors (not shown).

During some conditions, controller 12 may vary the signals provided to actuators 152 and 154 to control the opening and closing of the respective intake and exhaust valves. The valve actuators may be of an electric valve actuation type, a cam actuation type, or a combination thereof. The intake and exhaust valve timing may be controlled concurrently, or any of a possibility of variable intake cam timing, variable exhaust cam timing, dual independent variable cam timing, or fixed cam timing may be used. Each cam actuation system may include one or more cams and may utilize one or more of cam profile switching (CPS), variable cam timing (VCT), variable valve timing (VVT), and/or variable valve lift (VVL) systems that may be operated by controller 12 to vary valve operation. For example, cylinder 14 may alternatively include an intake valve controlled via electric valve actuation and an exhaust valve controlled via cam actuation, including CPS and/or VCT. In other examples, the intake and exhaust valves may be controlled by a common valve actuator (or actuation system) or a variable valve timing actuator (or actuation system).

Cylinder 14 can have a compression ratio, which is a ratio of volumes when piston 138 is at bottom dead center (BDC) to top dead center (TDC). In one example, the compression ratio is in the range of 9:1 to 10:1. However, in some examples where different fuels are used, the compression ratio may be increased. This may happen, for example, when higher octane fuels or fuels with higher latent enthalpy of vaporization are used. The compression ratio may also be increased if direct injection is used due to its effect on engine knock.

In some examples, each cylinder of engine 10 may include a spark plug 192 for initiating combustion. An ignition system 190 can provide an ignition spark to combustion chamber 14 via spark plug 192 in response to a spark advance signal SA from controller 12, under select operating modes. A timing of signal SA may be adjusted based on engine operating conditions and driver torque demand. For example, spark may be provided at maximum brake torque (MBT) timing to maximize engine power and efficiency. Controller 12 may input engine operating conditions, including engine speed, engine load, and exhaust gas AFR, into a look-up table and output the corresponding MBT timing for the input engine operating conditions. In other examples the engine may ignite the charge by compression as in a diesel engine.

In some examples, each cylinder of engine 10 may be configured with one or more fuel injectors for providing fuel thereto. As a non-limiting example, cylinder 14 is shown including a fuel injector 166. Fuel injector 166 may be configured to deliver fuel received from a fuel system 8. Fuel system 8 may include one or more fuel tanks, fuel pumps, and fuel rails. Fuel injector 166 is shown coupled directly to cylinder 14 for injecting fuel directly therein in proportion to the pulse width of a signal FPW-1 received from controller 12 via an electronic driver 168. In this manner, fuel injector 166 provides what is known as direct injection (hereafter also referred to as "DI") of fuel into cylinder 14. While FIG. 1 shows fuel injector 166 positioned to one side of cylinder 14, fuel injector 166 may alternatively be located overhead of the piston, such as near the position of spark plug 192. Such a position may increase mixing and combustion when operating the engine with an alcohol-based fuel due to the lower volatility of some alcohol-based fuels. Alternatively, the injector may be located overhead and near the intake valve to increase mixing. Fuel may be delivered to fuel injector 166 from a fuel tank of fuel system 8 via a high pressure fuel pump and a fuel rail. Further, the fuel tank may have a pressure transducer providing a signal to controller 12.

Fuel injector 170 is shown arranged in intake manifold 146, rather than in cylinder 14, in a configuration that provides what is known as port fuel injection (hereafter referred to as "PFI") into the intake port upstream of cylinder 14. Fuel injector 170 may inject fuel, received from fuel system 8, in proportion to the pulse width of signal FPW-2 received from controller 12 via electronic driver 171. Note that a single driver 168 or 171 may be used for both fuel injection systems, or multiple drivers, for example driver 168 for fuel injector 166 and driver 171 for fuel injector 170, may be used, as depicted.

In an alternate example, each of fuel injectors 166 and 170 may be configured as direct fuel injectors for injecting fuel directly into cylinder 14. In still another example, each of fuel injectors 166 and 170 may be configured as port fuel injectors for injecting fuel upstream of intake valve 150. In yet other examples, cylinder 14 may include only a single fuel injector that is configured to receive different fuels from the fuel systems in varying relative amounts as a fuel mixture, and is further configured to inject this fuel mixture either directly into the cylinder as a direct fuel injector or upstream of the intake valves as a port fuel injector.

Fuel may be delivered by both injectors to the cylinder during a single cycle of the cylinder. For example, each injector may deliver a portion of a total fuel injection that is combusted in cylinder 14. Further, the distribution and/or relative amount of fuel delivered from each injector may vary with operating conditions, such as engine load, knock, and exhaust temperature, such as described herein below. The port injected fuel may be delivered during an open intake valve event, closed intake valve event (e.g., substantially before the intake stroke), as well as during both open and closed intake valve operation. Similarly, directly injected fuel may be delivered during an intake stroke, as well as partly during a previous exhaust stroke, during the intake stroke, and partly during the compression stroke, for example. As such, even for a single combustion event, injected fuel may be injected at different timings from the port and direct injector. Furthermore, for a single combustion event, multiple injections of the delivered fuel may be performed per cycle. The multiple injections may be performed during the compression stroke, intake stroke, or any appropriate combination thereof.

Fuel injectors 166 and 170 may have different characteristics. These include differences in size, for example, one injector may have a larger injection hole than the other. Other differences include, but are not limited to, different spray angles, different operating temperatures, different targeting, different injection timing, different spray characteristics, different locations etc. Moreover, depending on the distribution ratio of injected fuel among injectors 170 and 166, different effects may be achieved.

Fuel tanks in fuel system 8 may hold fuels of different fuel types, such as fuels with different fuel qualities and different fuel compositions. The differences may include different alcohol content, different water content, different octane, different heats of vaporization, different fuel blends, and/or combinations thereof etc. One example of fuels with different heats of vaporization could include gasoline as a first fuel type with a lower heat of vaporization and ethanol as a second fuel type with a greater heat of vaporization. In another example, the engine may use gasoline as a first fuel type and an alcohol containing fuel blend such as E85 (which is approximately 85% ethanol and 15% gasoline) or M85 (which is approximately 85% methanol and 15% gasoline) as a second fuel type. Other feasible substances include water, methanol, a mixture of alcohol and water, a mixture of water and methanol, a mixture of alcohols, etc.

Fuel system 8 may further include a fuel vapor purge (FVP) system (e.g., an evaporative emissions system or emissions control system), as shown in FIG. 2 and described further below. The FVP system may be coupled to the fuel tank(s) and the AIS to mitigate escape of vapors from fuel system 8. The vapors may be stored within components of the FVP system and transferred back to engine 10 for combustion. However, while the FVP system effectively control release of fuel vapors from fuel system 8, evaporative hydrocarbons may be emitted from other regions of vehicle 5. For example, as indicated by dashed areas, a first emitting zone 182 may be located at intake passage 142, a second emitting zone 184 may be positioned at CAC 165, a third emitting zone 186 may be located at intake manifold 146, and a fourth emitting zone 188 may be located at exhaust manifold 148.

Hydrocarbons may accumulate in the AIS (e.g., at the first emitting zone 182) due to delivery of hydrocarbon vapors from other regions of vehicle 5. For example, during purging of a fuel canister (as shown in FIG. 2), desorbed fuel vapors may be flowed to passage of the AIS and delivered to engine 10 for combustion. When the engine is turned off, some amount of purged hydrocarbon vapors may remain in the AIS. At the second emitting zone 184, hydrocarbon vapor may similarly accumulate due to fuel canister. In addition, exhaust gases may be recirculated to a point upstream of compressor 174 via low-pressure exhaust gas recirculation (LP-EGR), as shown in FIG. 2, thereby increasing hydrocarbon levels in gases flowing through CAC 165 which may remain at CAC 165 when the engine is turned off. At intake manifold 146, hydrocarbon vapors may be introduced via fuel canister purging (as shown in FIG. 2), as well as high-pressure exhaust gas recirculation (HP-EGR). Furthermore, when vehicle 5 includes a crankcase ventilation system (not shown), evaporative emissions may be directed to intake manifold 146 when crankcase venting occurs. Residual vapors may remain in intake manifold 146 if engine 10 is turned off while hydrocarbon vapors are circulating through intake manifold 146 due to fuel purging and/or HP-EGR. As well, fuel may be trapped in oil in intake manifold 146 which may evaporate after engine shutdown. Evaporative emissions may also accumulate in exhaust manifold 148 due to flow of burned and partially burned fuel from the cylinders 14 to exhaust manifold 148, which may remain in exhaust manifold 148 when the engine is turned off. As well, after engine shutdown, gases remaining in the cylinders 14 may gradually leak from the cylinder bores and the engine crankcase into intake manifold 146 and exhaust manifold 148. Further sources of evaporative emissions include a secondary air emission system, when present, and fuel leakage from both PFI and DI injectors after engine shutdown while fuel rails are still pressurized. Thus over time, evaporative emissions in the third and fourth emitting zones 186, 188 may increase.

It will be appreciated that other examples may include additional and/or alternate locations from which hydrocarbon vapors may be emitted. For example, intake passage 144, a crankcase of engine 10, cylinder bores of engine 10, etc., may also be prone to emitting hydrocarbons. Each of the emitting zones may become a reservoir for evaporative emissions during engine operation, resulting in undesirable release of hydrocarbons to the atmosphere. HC sensors may be arranged at each of the emitting zones to monitor a level or concentration of hydrocarbons therein.

In one example, evaporative emissions from the emitting zones may be captured and directed to the FVP system. The emissions may thus be treated similar to fuel vapors generated in the fuel tank(s), effectively sealing the emissions within the FVP system. Capture of emissions from the emitting zones may be achieved by implementing a port-based emissions capture (PBEC) system. The PBEC system may couple the emitting zones to the FVP system, relying on a vacuum source to sequester gases in a canister of the FVP system. Details of the PBEC system are provided below, with reference to FIGS. 2-4.

Controller 12 is shown in FIG. 1 as a microcomputer, including a microprocessor unit 106, input/output ports 108, an electronic storage medium for executable programs (e.g., executable instructions) and calibration values shown as non-transitory read-only memory chip 110 in this particular example, random access memory 112, keep alive memory 114, and a data bus. Controller 12 may receive various signals from sensors coupled to engine 10, including signals previously discussed and additionally including a measurement of inducted mass air flow (MAF) from a mass air flow sensor 122; an engine coolant temperature (ECT) from a temperature sensor 116 coupled to a cooling sleeve 118; an exhaust gas temperature from a temperature sensor 158 coupled to exhaust manifold 148; a profile ignition pickup signal (PIP) from a Hall effect sensor 120 (or other type) coupled to crankshaft 140; throttle position (TP) from a throttle position sensor; signal EGO from exhaust gas sensor 128, which may be used by controller 12 to determine the AFR of the exhaust gas; and an absolute manifold pressure signal (MAP) from a MAP sensor 124. An engine speed signal, RPM, may be generated by controller 12 from signal PIP. The manifold pressure signal MAP from MAP sensor 124 may be used to provide an indication of vacuum or pressure in the intake manifold 146. Controller 12 may infer an engine temperature based on the engine coolant temperature and infer a temperature of catalyst 178 based on the signal received from temperature sensor 158. Additional sensors providing data to controller 12 are shown in FIG. 2 and described further below.

Controller 12 receives signals from the various sensors of FIGS. 1 and 2 and employs various actuators of FIGS. 1 and 2 to adjust engine operation based on the received signals and instructions stored on a memory of the controller. For example, upon receiving a signal from the Hall effect sensor 120 indicating that the engine has stopped rotating, controller 12 may command activation of a vacuum pump of the PBEC system and adjust various valves of the FVP system to capture evaporative emissions from the first, second, third, and fourth emitting zones 182, 184, 186, and 188 of vehicle 5.

As described above, FIG. 1 shows only one cylinder of a multi-cylinder engine. As such, each cylinder may similarly include its own set of intake/exhaust valves, fuel injector(s), spark plug, etc. It will be appreciated that engine 10 may include any suitable number of cylinders, including 2, 3, 4, 5, 6, 8, 10, 12, or more cylinders. Further, each of these cylinders can include some or all of the various components described and depicted by FIG. 1 with reference to cylinder 14.

Certain regions of a vehicle may retain evaporated hydrocarbons during engine operation. Such regions may include AIS components, such as intake passages, an intake manifold, a CAC, as well as an exhaust manifold, etc., as indicated in FIG. 1, amongst others. The vapors accumulated in such reservoirs may be released to the atmosphere when openings of various valves of an engine system are adjusted.

By configuring the vehicle with a PBEC system, release of the vapors may be mitigated by trapping the vapors within an FVP system of the vehicle. As such, the PBEC system may provide a bridge between the emitting regions or zones of the vehicle and an efficient system for capturing emissions.

An example of a PBEC system 200 is shown in FIG. 2. The PBEC system 200 is coupled to components of vehicle 5 of FIG. 1. As such, common components are similarly numbered and will not be re-introduced. The vehicle 5 additionally includes, with respect to components shown in FIG. 1, more than one cylinder 14 arranged in a cylinder bank 202 of engine 10. A turbine waste-gate 204 may divert exhaust flow around turbine 176 to moderate a speed of turbine 176, and hence, a speed of compressor 174. A compressor bypass 206 with a compressor bypass valve (CBV) 208 may allow intake air to be routed around compressor 174 when the CBV 208 is adjusted open. A first barometric pressure (BP) sensor 210 may be arranged in intake passage 142 to measure ambient pressure and a throttle inlet pressure (TIP) sensor 212 may be positioned immediately upstream of the throttle 162 to measure a pressure at the throttle inlet.

Vehicle 5 may optionally include a HP-EGR path 260 routing exhaust gases from exhaust manifold 148, or a region downstream of exhaust manifold 148 and upstream of turbine 176, to intake manifold. The HP-EGR path 260 includes a first EGR valve 262 controlling flow of gases through the HP-EGR path 260. A LP-EGR path 270 may also be implemented in vehicle 5, flowing exhaust gases from downstream of turbine 176 to upstream of compressor 174. A second EGR valve 272 may control recirculation of gases through the LP-EGR path 270.

Fuel system 8 of vehicle 5 has a fuel tank 203 storing fuel to be combusted at engine 10. As described above the fuel may be a variety of fuel types. Furthermore, fuel system 8 may be adapted with a FVP system 214. The FVP system 214 includes a plurality of conduits flowing fuel vapors to and from a fuel canister 216. The fuel canister 216 receives fuel vapors from the fuel tank 203 via conduit 218. A pressure level may in the fuel tank 203 may be monitored by a fuel tank pressure transducer (FTPT) 220 and flow of vapor through conduit 218 may be controlled by a vapor blocking valve (VBV) 222. In one example, the VBV 222 may be similar to a fuel tank isolation valve and may be commanded to open (e.g., commanded by controller 12) to allow the fuel vapors in the fuel tank 203 to be vented to the fuel canister 216 when the pressure level in the fuel tank 203, as measured by the FTPT 220, rises beyond a threshold level. When venting of the fuel tank 203 is not desired, the VBV 222 may be maintained closed.

The fuel canister 216 may enclose an adsorbent material with a significant capacity for storing evaporated hydrocarbons (e.g., via physisorption) as well as vapor-phase alcohol- and/or ester-based fuels. As an example, the fuel canister 216 may be filled with activated carbon granules and/or another type of high surface area material. However, the adsorbent material may become saturated with prolonged use and may therefore be periodically purged of adsorbed fuel. A temperature sensor 215 may be coupled to the fuel canister 216 to monitor a temperature of the fuel canister 216 where the temperature may be used to infer a saturation level of the fuel canister 216. For example, heat is generated during vapor adsorption, causing an increase in temperature at the fuel canister 216. Conversely, during desorption, heat is consumed and the fuel canister 216 temperature decreases.

Alternatively, fuel canister saturation may also be determined by, for example, referring to a model estimating saturation based on a time since a prior purging event as well as vehicle operating conditions. As another example, saturation may be inferred based on a rate of air flow through the canister which may decreases as the fuel canister adsorbs vapors. During purging, the fuel canister 216 may be exposed to low pressure at intake manifold 146 and fresh air may be drawn into the fuel canister 216 through vent 224 when a canister vent valve (CVV) 226 is commanded to open. A second BP sensor 228 may be positioned along vent 224.

As fresh air is drawn through fuel canister 216, physisorbed fuel is desorbed and carried out of the fuel canister 216 through conduit 230 when a canister purge valve (CPV) 232 is commanded open. At the CPV 232, the fuel vapor may travel along two possible paths. A first path 234 includes flowing the vapor through a first check valve 236 and to intake manifold 146. The first check valve 236 may be configured as a one-way valve, allowing unidirectional flow therethrough and inhibiting flow in a reverse direction, e.g., from intake manifold 146 to fuel canister 216. Fuel vapor may be drawn into intake manifold 146 due to a lower pressure at intake manifold 146, e.g., due to vacuum formation, than at fuel canister 216. Thus, the first path 234 may also be a vacuum path 234.

Alternatively, desorbed fuel may travel from the CPV 232 to intake passage 142, upstream of compressor 174 along a second path 238. The second path 238 includes an ejector 240 and a second check valve 242 located downstream of the ejector 240. The ejector 240 may be an aspirator drawing vapor flow therethrough based on a Venturi effect generated at the ejector 240 as air flows into intake passage 142. The second check valve 242 may be similarly configured as the first check valve 236 and may inhibit reverse flow of gases, e.g., from intake passage 142 to fuel canister 216. As low pressure generated at the ejector 240 occurs when boosted air is delivered to intake manifold 146, promoting delivery of fuel vapor to engine 10 via the second path 238 rather than the vacuum path 234, the second path 238 may also be a boosted path 238.

The fuel canister 216 may be purged and desorbed contents of the fuel canister 216 (e.g., purge flow) may pass through either the first path 234 or the second path 238 depending on engine conditions. For example, the purge flow may travel through the first path 234 when intake air flow into the engine is not limited, such as during unboosted operation and/or when engine loads are high. When intake air flow into the engine is limited, such as during boosted operation, the purge flow may flow through the second path 238. In some instances, however, such as when the vacuum at intake manifold 146 is shallow and a pressure at the throttle inlet is slightly above ambient, purged vapors from the fuel canister 216 may flow to the engine through both paths concurrently. The arrangement of passive valves, e.g., the first and second check valves 236, 242, along the first and second paths 234, 238, respectively, enables purging of the fuel canister 216 to occur via a suitable route without dependency on the controller 12 to control the path of flow.

It will be appreciated that the FVP system 214 shown in FIG. 2 is a non-limiting example and a configuration of the FVP system may vary without departing from the scope of the present disclosure. Other examples may include variations in configuration of purge flow routes from the fuel canister to the engine, e.g., alternate paths coupling the fuel canister to other regions of the AIS, in location and presence of valves controlling flow direction, positioning and number of ejectors. More than one fuel canister may be included in other examples of the FVP system.

The PBEC system 200 may be coupled to engine 10 by a plurality of vacuum lines (as indicated by dashed arrows) and to the FVP system 214 by a plurality of conduits (as indicated by solid, bold arrows). More specifically, the plurality of vacuum lines may include a first line 244 extending between intake passage 142 and a vacuum source, e.g., a first pump 246 which may be a vacuum pump 246, of the PBEC system 200, a second line 248 extending between exhaust manifold 148 and the vacuum pump 246, a third line 250 extending between intake manifold 146 and the vacuum pump 246, and a fourth line 252 extending between CAC 165 and the vacuum pump 246. Each of the vacuum lines may fluidically couple a component of vehicle 5 to the vacuum pump 246. Each component coupled to one of the vacuum lines may be a hydrocarbon-emitting component corresponding to one of the first, second, third, and fourth emitting zones 182, 184, 186, and 188 shown in FIG. 1. Thus, the vacuum pump 246 is fluidically coupled through the vacuum lines to zones of engine 10 prone to storing evaporative hydrocarbons.

The vacuum lines, e.g., the first, second, third, and fourth lines 244, 248, 250, and 252, may be connected to the corresponding components of vehicle 5 by vacuum ports. The vacuum ports (e.g., also referred to a vacuum pucks or vacuum valves) allow a pressure at the vacuum pump 246 to be communicated to the vehicle components through the vacuum lines to draw vapors from the component to the vacuum pump 246. The vacuum ports may have a variety of configurations and may be securely coupled, e.g., fixedly coupled, to the vehicle component. For example, the vacuum ports may be embedded in a wall of intake passage 142, a surface of intake manifold 146, an inlet of CAC 165, etc. In some examples, intake passage 142 may include an air filter and the first line 244 may be coupled to the air filter by one of the vacuum ports arranged in a box of the air filter. Furthermore, the vacuum ports may include threaded fittings configured to allow coupling of similarly threaded fittings on ends of the vacuum lines. Other types of fitting are possible, including quick-connect fittings, clamps, etc.

Other locations for the vacuum ports include an exhaust side of turbocharger 175, and along the first and second paths 234, 238 of the FVP system 214. Along the AIS, vacuums ports may be positioned in front of any source of hydrocarbons, such as at a purge valve entry into the AIS, to increase a likelihood of hydrocarbon capture after the engine is shut off and concentration gradients drive flow of hydrocarbons out of the AIS towards the air filter. At intake manifold 146 and exhaust manifold 148, the vacuum ports may be placed before or after any source of hydrocarbon entry. In instances where a secondary air injection air source is present, the vacuum ports may be arranged before a fresh air source location.

In some examples, the vacuum ports may include sensors configured to measure a pressure or vacuum level at the vacuum ports. The sensors may send signals to the controller 12 indicating an amount of vacuum at each of the coupled vehicle components when the vacuum pump 246 is on and actively evacuating the components. Alternatively the sensors may be arranged in the vacuum lines. The PBEC system 200 may enable hydrocarbon concentration to be measured by the sensors in various regions of vehicle 5 according to a specific emissions reduction strategy.

A location of the vacuum ports on each vehicle component, e.g., intake manifold 146, exhaust manifold 148, CAC 165, intake passage 142, may be optimized to provide efficient evacuation of gases within the component. The location of the vacuum ports at each component may vary based on a geometry of the component, an estimated amount of evaporative emission to be removed, and availability of space. In addition, more than one vacuum port may be disposed in each of the components. For example, at regions where high concentration of emission is expected, such as at exhaust manifold 148, two or more vacuum ports may be present to increase vacuum and evacuation efficiency. As well, the emitting zones shown in FIG. 1 are non-limiting examples of vehicle regions where evaporative emissions are likely to accumulate. Other examples may include positioning vacuum ports at various locations of vehicle 5, such as anywhere along the AIS, along exhaust passages coupled to exhaust manifold 148, at an oil pan, at the throttle 162, at a crankcase of engine 10, at cylinder bores, etc.

The vacuum pump 246 may be positioned proximate to engine 10 within a front compartment of vehicle 5, allowing a length of the vacuum lines to be minimized. However, the vacuum pump 246 may be located in other regions of vehicle 5, depending on availability of packaging space and a footprint of the vacuum pump 246. A size of the vacuum pump 246 may be based on a magnitude of vacuum generation that sufficiently reduces vehicle emissions to a target level, on a size of the components to be evacuated, and on vehicle application. The vacuum pump 246 may be commanded on and off by the controller 12 as described further below.

The plurality of conduits connecting the vacuum pump 246 to the fuel canister 216 includes a first conduit 254 channeling flow of gases from the vacuum pump 246 to a second pump 256, which may also be an electrically-driven vacuum pump. In other examples, however, the second pump 256 may instead be another type of pump. The second pump 256 may draw evaporative emissions evacuated from the vehicle components from the vacuum pump 246 along the first conduit 254 and continue driving flow along a second conduit 258 of the plurality of conduits to the fuel canister 216. The evaporative emissions may be stored at fuel canister 216 along with fuel vapors from the fuel tank 203 until purging of the fuel canister 216 is commanded. The stored gaseous hydrocarbons may be returned to engine 10 upon purging, as described above, and combusted.

The storage of evaporative emissions at the fuel canister 216 via the PBEC system 200, in addition to fuel vapors from the fuel tank 203, may demand a larger fuel canister volume. Thus, a size of the fuel canister 216 may be increased to accommodate the additional gases. In one example, a length to diameter ratio of the fuel canister 216 may be modified to increase a diffusion path length of the fuel canister 216 and minimize pressure drop. Opening of the CVV 226 to enable purge flow may be adjusted and optimized to accommodate a different loading of the fuel canister resulting from additional input of hydrocarbons from the PBEC system 200. For example, during purging events occurring immediately after operation of the PBEC system 200, an opening of the CVV 226 may be adjusted to increase purge flow compared to when only fuel vapors from the fuel tank 203 are to be purged. Alternatively or additionally, more than one fuel canister may be included in vehicle 5. For example, an additional fuel canister may be directly coupled to the vacuum pump 246 via the second pump 256 instead of the fuel canister 216 of the FVP system 214. The additional fuel canister may receive evaporative emissions from the PBEC system 200 exclusively and may be fluidically coupled to engine 10, allowing desorbed hydrocarbons from the additional fuel canister to be burned at engine 10. As another example, the vacuum pump 246 may be coupled to the fuel canister 216 by the second pump 256 and coupled to the additional fuel canister by an additional pump, providing two separate paths for evaporative emissions storage. When more than one fuel canister is incorporated in vehicle 5, purging of the more than one fuel canister may be regulated such that only one fuel canister is purged at a time to circumvent overloading engine 10 with evaporative emissions and causing poor performance.

Evaporative emissions of the vehicle may thereby be reduced by adapting the vehicle with the PBEC system. The PBEC system may be activated when the engine is off, e.g., not operating, by turning on the vacuum pump to evacuate components to which the vacuum pump is fluidically coupled via the vacuum lines and vacuum ports. In one example, activation of the vacuum pump may be determined at least partially based on hydrocarbon concentration as measured by HC sensors arranged at each component coupled to the PBEC system. Operation of the vacuum pump may rely on an optimized approach for efficiently evacuating the components. For example, a duration of operation or a cycling of vacuum pump activity may be adjusted based on operating conditions, engine configuration, vehicle application, etc.

Additional strategies for operating the PBEC system may include closing the throttle to enable vacuum formation, closing intake and/or exhaust valves by phasing one or more camshafts and/or valve lift mechanisms to trap and expel cylinder charge into the intake manifold or exhaust manifold. The phasing may vary depending on vacuum port location. As another example, the engine may be rotated by a starter after shutdown, or during shutdown with no spark or fuel injection, to control an amount of partially burned combustion products in the cylinders to be directed to the vacuum ports.

Implementation of the PBEC system in an ICE may allow stringent emissions standards to be met. Performance and heavy duty vehicles relying on ICEs may continue to be marketable as a result. The PBEC system may provide an efficient and low cost method for reducing evaporative emissions without demanding reconfiguration of the engine. Vacuum ports may be readily incorporated into vehicle components at any stage during manufacture and may also be adapted to already existing vehicles, e.g., vehicles unable to meet current or anticipated emissions regulations may be retrofitted with the PBEC system. Furthermore, in instances where the PBEC system is coupled to a crankcase of the engine, use of costly, low permeation seals may be precluded. An amount of time for development and testing of an emission system, as well as time for verifying if the system complies with regulations, may be decreased. The PBEC system may thus be an effective and dynamic strategy for reducing evaporative emissions for a variety of ICE vehicles over a wide range of vehicle production stages.

An example of a routine 300 for operating a PBEC system, such as the PBEC system 200 of FIG. 2 is depicted in FIG. 3. The PBEC system may be coupled to an engine system and to a FVP system of a vehicle. As indicated in FIG. 1 and shown in FIG. 2, vacuum lines of the PBEC system may extend between a vacuum pump and vacuum ports arranged in vehicle components prone to storing and releasing evaporative emissions. The vacuum pump may be fluidically coupled to a second pump configured to pump evacuated evaporative hydrocarbons from the vacuum pump to one or more fuel canisters of the FVP system. A first fuel canister of the one or more fuel canisters may be fluidically coupled to one or more fuel tanks of the vehicle and to an engine of the vehicle. In addition, the vehicle may optionally include a second fuel canister coupled to the vacuum pump and to the engine of the vehicle. As such, when the vehicle has a single fuel canister, as shown in FIG. 2, the single fuel canister may store hydrocarbons from both the one or more fuel tanks and the PBEC system. Alternatively, when the vehicle includes both first and second fuel canisters, fuel tank vapors may be stored exclusively at the first fuel canister while evaporative emissions from the PBEC system may be stored exclusively at the second fuel canister, in one example. In another example, the first and second fuel canisters may be configured such that evaporative hydrocarbons may be stored at either of the fuel canisters depending on a level of saturation of the fuel canisters. Purging of each of the first and second fuel canisters may be controlled by opening respective CVVs of the fuel canisters. The vacuum pump and second pump may be maintained off during engine operation. Instructions for carrying out routine 300 and the rest of the methods included herein may be executed by a controller, such as controller 12 of FIGS. 1 and 2, based on instructions stored on a memory of the controller and in conjunction with signals received from sensors of the engine system, such as the sensors described above with reference to FIGS. 1 and 2. The controller may employ engine actuators of the engine system to adjust engine operation, according to the methods described below.

At 302, the routine includes estimating engine operating conditions. For example, the controller may receive information regarding engine speed from a Hall effect sensor such as the Hall effect sensor 120 of FIG. 1, throttle position from a throttle position sensor, phasing of one or more camshafts from one or more camshaft position sensors, and hydrocarbon levels in various regions of the vehicle, including the AIS, intake manifold, exhaust manifold, etc., from HC sensors. The controller may also infer an amount of fuel vapor purged from the one or more fuel canisters, which may occur during engine operation by opening a CVV (e.g., the CVV 226 of FIG. 2), based on a temperature of the fuel canisters as measured by a temperature sensor, e.g., the temperature sensor 215 of FIG. 2.

The routine determines if the engine is off at 304. For example, the controller may confirm a status of the engine based on the signal from the Hall effect sensor. If the engine is determined to not be off, e.g., a crankshaft of the engine is rotating and an air/fuel mixture is combusted at the engine's combustion chambers, the routine proceeds to 306 to continue engine operation under the current operating conditions. Routine 300 then returns to 302 to continue monitoring and estimating the operating conditions.

If the engine is determined to be off at 304, the routine continues to 305 to confirm if refueling of the one or more fuel tanks is requested. Refueling may be requested by a vehicle operator and indicated, for example, by removal of a fuel cap and/or insertion of a nozzle into a neck of one of the fuel tanks. During refueling, a VBV (e.g., the VBV 222 of FIG. 2) may be opened to allow fuel vapors to vent to the one or more fuel canisters. Thus, during refueling, the PBEC system may not be operated when the vehicle includes one fuel canister to store both fuel vapors from the one or more fuel tanks and evaporative emissions from the PBEC system.

In instances where the vehicle has one fuel canister and refueling is requested, the routine continues to 307 to maintain the pumps of the PBEC system off. The routine returns to 304. If refueling is not requested, the routine continues to 308 to evaluate a hydrocarbon saturation level of the fuel canister. However, the fuel canister may, in some examples, be sufficiently large to accommodate adsorption of fuel vapors during refueling while operating the PBEC system to adsorb evaporative emissions from the vehicle. As such, the routine may continue to 308 even if refueling is requested.

In some examples, the vehicle may have more than one fuel canister. For example, the vehicle may have the first and second canisters as described above. In one example, the first fuel canister may be used to store fuel vapors from the one or more fuel tanks while the second fuel canister may be used to store evaporative emissions from the PBEC system. Thus, even during refueling events, the second fuel canister may be available for operation of the PBEC system. As such, the routine continues to 308.

In yet another example, the first and second fuel canisters may not be exclusively used for either fuel vapor or evaporative emission storage. Instead, both fuel canisters may be used indiscriminately for both type of storage. For example, the first fuel canister may be used until saturated and then systems turn to the second fuel canister for hydrocarbon storage. The routine may proceed to 307 to maintain the pumps of the PBEC system off when refueling is requested or else proceed to 308 if refueling is not demanded.

At 308, the routine includes assessing a saturation level of the one or more fuel canisters. For example, when the vehicle has only one fuel canister, the controller may estimate an amount of adsorbed hydrocarbons at the fuel canister based on a temperature of the fuel canister, e.g., as measured by the temperature sensor coupled to the first fuel canister. As an example, the controller may use a most recent measured temperature of the fuel canister obtained immediately prior to engine shutdown. The controller may refer to, for example, a look-up table stored in the controller's memory, the look-up table providing a relationship between fuel canister temperature and a hydrocarbon saturation level of the fuel canister. The saturation level of the fuel canister may be compared to a first threshold which may be a saturation level approaching or at a maximum adsorption capacity of the fuel canister.

In examples where the vehicle includes more than one fuel canister, each fuel canister may be evaluated for saturation. For example, the vehicle may also include the second fuel canister, coupled to the vacuum pump, and also coupled to the one or more fuel tanks in some examples, and configured to store evaporative emissions evacuated from vehicle components by the PBEC system. The controller may similarly assess the saturation level of the second fuel canister as described above.

When the single fuel canister is included in the vehicle and the saturation level of the fuel canister is determined to be at least equal to the first threshold, the routine continues to 310 to request purging of the fuel canister upon subsequent engine startup. As the fuel canister is saturated, further adsorption of evaporative emissions is precluded. The routine ends. However, if the single fuel canister does not meet the first threshold, the routine continues to 312 to prepare for vacuum generation at the emitting zones of the vehicle, e.g., regions coupled to the PBEC system.

Returning to 308, when both the first and second fuel canisters are included, the routine includes determining if at least one of the fuel canisters is at a saturation level equal to or greater than the first threshold. If saturation of one of the fuel canisters is determined to reach the first threshold, the routine continues to 310 to request purging of the saturated fuel canister. For example, the controller may determine that the first fuel canister is saturated but the second fuel canister is not. The request for purging upon subsequent engine startup may be directed to the first fuel canister and, in some examples, valves controlling flow to the first fuel canister from the fuel tank (e.g., VBV 222 of FIG. 2) and from the PBEC system (not shown in FIG. 2) may be closed. Instead evaporative emissions may be collected exclusively at the second fuel canister, e.g., by opening or maintaining open valves controlling flow of fuel vapor and evaporative emissions to the second fuel canister. The routine may proceed to 312 with respect to the second fuel canister.

In yet another example, both the first and second fuel canisters may be below the first threshold and the routine may continue to 312. As such, both fuel canisters may be used to store evaporative emissions from the PBEC system. In some instances, the fuel canisters may be used sequentially, e.g., the first fuel canister is used until saturated and then fuel vapors and evaporative emissions are stored at the second fuel canister. In other examples, each fuel canister may be designated for specific applications. For example, the first fuel canister may exclusively receive fuel vapors from the one or more fuel tanks and the second fuel canister may exclusively receive evaporative emissions from the PBEC system.

At 312, preparing for vacuum generation includes adjusting engine components to enable vacuum to form in the engine. For example, the throttle may be adjusted to a closed position, one or more camshafts may be phased to close cylinder intake and/or exhaust valves, and a crankshaft may be rotated by a starter to push a target amount of partially burned combustion products in the cylinders to vacuum ports coupled to the cylinder bores.

The routine includes activating each of the vacuum and second pump at 314 to evacuate evaporative emissions from components of the vehicle in which the vacuum ports are disposed. The evaporative emissions may be pumped to the non-saturated fuel canister(s) (as described above) for storage. Power provided to the vacuum pump may be moderated based on environmental conditions and vehicle driving history. For example, a magnitude of vacuum pump power may be increased when ambient temperature is high, e.g., on a hot summer day, due to a likelihood of increased evaporation of hydrocarbons. As another example, recent engine operation at high loads and speeds may also lead to operation of the vacuum pump at higher power. A power output provided to the vacuum pump may also be adjusted based on a powertrain of the vehicle, an age or mileage of the vehicle, etc.

In some instances, as described above, hydrocarbon vapors may gradually accumulate as residual gases in engine components such as a crankcase, cylinder bores, etc. may leak into the intake and exhaust manifolds. As such, in some examples, activation of the pumps may be delayed for a period of time estimated for residual gases to leak into the regions to which the PBEC is coupled. In other examples, the pumps may be operated for a pre-set period of time immediately upon confirmation that the PBEC system is to be activated and then deactivated, or actuated initially, deactivated, and then reactivated after a delay, or any combination of the above protocols. Pump operation may be modified based on measurement of hydrocarbon levels by the HC sensors.

At 316 the routine includes confirming if engine operation is requested. Engine operation, e.g., startup, may be indicated by a key-on event, for example. The request for engine operation may be prioritized over capture of evaporative emissions by the PBEC system and the routine proceeds to 318 to deactivate the vacuum pump and the second pump if engine operation is indicated.

If engine operation is not requested, the routine proceeds to 320 to assess the saturation level of the one or more fuel canisters. Determining the saturation level may be conducted as described at 308. The second threshold may be similar to the first threshold. If at least one of the one or more fuel canisters reaches or surpasses the second threshold, the routine continues to 322 to request purging of the saturated fuel canister. Purging may be conducted upon subsequent operation of the engine. The routine may continue to 318 to deactivate the vacuum pump and the second pump in instances where the vehicle has one fuel canister. In examples where the vehicle has more than one fuel canister, and only one of the more than one fuel canisters are saturated, the routine includes scheduling future purging of the saturated canister at 322 but does not continue to 318 to deactivate the pumps. Instead, the routine concurrently proceeds to 324 to determine whether a hydrocarbon level at the emitting regions decreases to a third threshold.

Additionally, in instances where none of the more than one fuel canisters reach the second threshold of hydrocarbon saturation level, the routine continues to 324. At 324, the routine includes determining if a hydrocarbon level, e.g., concentration, at each of the emitting regions is at or below a third threshold. The third threshold may be a level of hydrocarbons representative of maximum evacuation of the emitting regions and reduction of evaporative emissions. A value of the third threshold may be based on vehicle fuel demands and system capabilities for emissions reduction.

If the hydrocarbon levels at the emitting regions do not decrease to the third threshold, the routine returns to 314 to continue operating the vacuum pump to evacuate evaporative emissions from the emitting regions. If the hydrocarbon levels decrease to at least the third threshold, the routine proceeds to deactivate the vacuum pump and the second pump at 326. The routine ends.

Alternatively, at 324, the routine may determine if an elapsed amount of time since pump activation reaches the third threshold which may be a pre-calibrated interval of time. For example, in instances where at least some of emitting regions are not monitored by HC sensors, an amount of time for hydrocarbon levels to be reduced to a target level may be estimated. If the period of pump operation reaches the third threshold, the routine continues to 326 and if the period does not reach the third threshold, the routine returns to 314.

In examples where the emitting regions are adapted with HC sensors, the pumps may be turned on and off based on measured hydrocarbons levels, e.g., cycled as described below. The HC sensors may be low power sensors configured to continue monitoring hydrocarbon levels even after engine shutdown to periodically or continuously measure hydrocarbon concentration in the emitting zones. For example, the controller may command monitoring of hydrocarbon levels in response to engine shutdown for a pre-set period of time. The pumps may be actuated according to hydrocarbon levels measured in real-time and/or previous vehicle operating conditions to match pump actuation to the hydrocarbon emissions output. As such, the routine may either rely on measured hydrocarbon levels or on duration of pump operation at 324 when HC sensors are used.

In another example, the vacuum pump may be operated cyclically, e.g., turned on and off multiple times, to evacuate evaporative emissions in increments. For example, the vacuum pump may be active until hydrocarbon levels are reduced by 20%. The vacuum pump may be deactivated briefly to allow evaporative emissions stored in the emitting regions to rise in pressure which may draw out hydrocarbon vapors from adjacent regions. The vacuum pump may be reactivated to reduce the measured again by 20% and then deactivated. Intervals of activation and deactivation may continue until hydrocarbon levels at all the emitting regions are reduced to a threshold level of hydrocarbons. Cyclical operation of the vacuum pump may be activated based on measured hydrocarbon levels or on a pre-calibrated interval if HC sensors are not used. Operating cycles of the vacuum pump may be adjusted based on vehicle demands, a target amount of emissions reduction, vehicle operating conditions, and/or engine hydrocarbon emission sources.

Examples of vehicle operations during capture of evaporative emissions of a PBEC system is illustrated in graph 400 in FIG. 4. Graph 400 represents activation of the PBEC system when refueling is not demanded and when a single fuel canister of a FVP system is included in a fuel system of the vehicle. The PBEC system is coupled to the fuel canister as shown in FIG. 2, via vacuum lines extending between vacuum ports and a vacuum pump, a second pump connected to the vacuum pump, and at least one conduit extending between the second pump and the fuel canister. Time is plotted along the x-axis in graph 400 and vehicle parameters are depicted along y-axes, including engine speed at plot 402, throttle position at plot 404 (e.g., ranging from fully closed to fully open), amount of intake valve lift at plot 406, and vacuum pump operation at plot 408.

A first example of evaporative hydrocarbon level at an intake manifold of the vehicle is shown at plot 410 and a second example is shown at plot 412. The hydrocarbon level may be measured by a HC sensor arranged in the intake manifold. A first threshold 414 is shown relative to plots 410 and 412, representing a threshold level of hydrocarbon evacuation. When the hydrocarbon level at the intake manifold is reduced to the first threshold 414, evacuation may be deemed complete and the vacuum pump may be deactivated in response. As such, plot 410 depicts a first scenario where hydrocarbon level is not reduced to the first threshold 414 and plot 412 illustrates a second scenario where evacuation by the PBEC system decreases hydrocarbon level below the first threshold 414. Similarly, a first example of fuel canister saturation, corresponding to the first scenario, is shown at plot 416 and a second example of fuel canister saturation is shown at plot 418, corresponding to the second scenario. For example, fuel canister saturation may be inferred based on a temperature of the fuel canister as measured by a temperature sensor. A second threshold 420 is depicted relative to plots 416 and 418, indicating complete saturation of the fuel canister where the fuel canister may no longer continue adsorbing hydrocarbons. As such, the first example of plot 416 illustrates full saturation of the fuel canister (e.g., purging of the fuel canister is demanded before the fuel canister may resume storing evaporative emissions) and the second example of plot 418 depicts a saturation level of the fuel canister below the second threshold 420.

At t0, the engine is running (plot 402), e.g., rotating as driven by a crankshaft, the throttle is open at a position between closed and fully open (plot 404), intake valve lift is activated (plot 406), and the vacuum pump is off (plot 408). At the intake manifold, hydrocarbon levels are high (plots 410 and 412) and above the first threshold 414 due to recirculation of exhaust gases via HP-EGR, venting of a crankcase via a crankcase ventilation system, purging of the fuel canister, etc. Hydrocarbon saturation of the fuel canister (plots 416 and 418) is below the second threshold 420.

At t1, the engine is turned off, e.g., a key-off event. Engine speed ramps down, the throttle is adjusted closed, and a camshaft is phased to close the intake valves. When the engine comes to a stop, the vacuum pump is turned on, causing the hydrocarbon level in the intake manifold to decrease. As evaporative emissions are evacuated from the intake manifold by the vacuum pump, the emissions are pumped to the fuel canister and stored therein, increasing the saturation level of the fuel canister.

The first scenario will now be described. At t2, the fuel canister saturation level (plot 416) reaches the second threshold 420. In spite of the hydrocarbon level in the intake manifold (plot 410) remaining above the first threshold 414, the vacuum pump is turned off in response to detection of the fuel canister becoming fully saturated. Between t2 and t3, the engine and vacuum pump remain inactive and the throttle and intake valves remained closed. The hydrocarbon level in the intake manifold and saturation of the fuel canister remains relatively uniform.

At t3, the engine is started, e.g., due to a key-on event. The throttle is adjusted open and the intake valves lift to allow combustion of air and fuel at the engine cylinders. As combustion occurs under unboosted conditions, vacuum generated at the intake manifold allows the fuel canister to be purged upon opening of a CVV. Hydrocarbon level at the intake manifold rises while saturation of the fuel canister decreases as hydrocarbons are desorbed from the fuel canister and flowed to the engine.

Turning now to the second scenario, at t2, the hydrocarbon level at the intake manifold (plot 412) drops below the first threshold 414. Saturation of the fuel canister (plot 418) remains below the second threshold 420. In response to the hydrocarbon level dropping below the first threshold 414 at the intake manifold, evacuation is deemed complete and the vacuum pump is deactivated. At t3, engine operation resumes and hydrocarbon level at the intake manifold rises. The fuel canister saturation level decreases as routine purging of the fuel canister occurs upon vacuum generation at the intake manifold.

In this way, evaporative emissions generated by a vehicle with an ICE may be efficiently reduced at low cost and without disruption to engine operation or reconfiguration of the engine. The vehicle may be adapted with a PBEC system, as shown in FIG. 2, including vacuum ports disposed in various vehicle components, such as the AIS, intake manifold, exhaust manifold, and CAC, amongst other engine regions prone to forming and/or storing gaseous hydrocarbons. The vacuum ports allow the components to be coupled to a vacuum pump which remains inactive during engine operation. When the engine is off, the vacuum pump may be activated to evacuate evaporative emissions from the components through the vacuum ports. Evaporative emissions removed via vacuum may be pumped by a second pump to at least one fuel canister where the hydrocarbons may be adsorbed and stored until the fuel canister is purged. The PBEC system may be adapted to the ICE vehicle at any stage of production and may be retrofit to already existing engine systems. Vacuum ports may be added to any vehicle components where evacuation of evaporative emissions is desired, allowing the vehicle to meet emissions standards at low cost. As such consumer demand for combustion-powered vehicles may be met while complying with emissions regulations.

The technical effect of configuring a vehicle with a PBEC system is that evaporative emissions may be captured from regions of the vehicle not coupled directly to a FVP system.

The disclosure also provides support for a system for capturing evaporative emissions, comprising: a plurality of vacuum ports disposed in hydrocarbon-emitting components of a vehicle, the plurality of vacuum ports fluidically coupled to a vacuum source configured to evacuate the hydrocarbon-emitting components and route evacuated evaporative emissions to an engine of the vehicle, wherein the vacuum source is activated to draw vacuum through each of the plurality of vacuum ports when the engine is not operating. In a first example of the system, the hydrocarbon-emitting components include one or more of an air induction system, an intake manifold, an exhaust manifold, and a charge air cooler. In a second example of the system, optionally including the first example, each of the plurality of vacuum ports is arranged in a respective surface of a respective hydrocarbon-emitting component and each of the hydrocarbon-emitting components is adapted with at least one of the plurality of vacuum ports. In a third example of the system, optionally including the first and second examples, the vacuum source is a vacuum pump coupled to a second pump. In a fourth example of the system, optionally including the first through third examples, the second pump is positioned between the vacuum pump and at least one fuel canister, the second pump fluidically coupled to each of the vacuum pump and the at least one fuel canister and wherein the second pump is configured to pump evaporative emissions evacuated by the vacuum pump to the at least one fuel canister for storage. In a fifth example of the system, optionally including the first through fourth examples, a first fuel canister of the at least one fuel canister is included in a fuel vapor purge system of the vehicle and wherein the first fuel canister is configured to deliver desorbed evaporative emissions to the engine when purged. In a sixth example of the system, optionally including the first through fifth examples, a second fuel canister of the at least one fuel canister is coupled to both the vacuum pump and to the engine and wherein the second fuel canister is configured to store evaporative emissions evacuated by the vacuum pump and deliver desorbed evaporative emissions to the engine when purged.

The disclosure also provides support for a method for a port-based emissions capture system, comprising: upon detection of engine shutdown, activating a vacuum pump to draw evaporative emissions from components of a vehicle, the vacuum pump coupled to the components by vacuum ports and vacuum lines, into a fuel canister fluidically coupled to an engine of the vehicle, and upon detection of engine startup, deactivating the vacuum pump and purging the evaporative emissions from the fuel canister into the engine. In a first example of the method, drawing evaporative emissions from the components into the fuel canister includes pumping the evaporative emissions via a second pump from the vacuum pump to the fuel canister. In a second example of the method, optionally including the first example, the vacuum pump is not activated when a request for refueling of a fuel tank of the vehicle is detected. In a third example of the method, optionally including the first and second examples, drawing evaporative emissions from the components of the vehicle includes drawing evaporative emissions via vacuum ports arranged at the components, where the components of the vehicle are prone to evaporative emissions. In a fourth example of the method, optionally including the first through third examples, further including deactivating the vacuum pump when a request for engine startup is detected. In a fifth example of the method, optionally including the first through fourth examples, further including deactivating the vacuum pump when saturation of the fuel canister is detected. In a sixth example of the method, optionally including the first through fifth examples, further including deactivating the vacuum pump when measured hydrocarbon levels at each of the components of the vehicle are below a threshold level. In a seventh example of the method, optionally including the first through sixth examples, drawing evaporative emissions from the components of the vehicle includes pumping evaporative emissions into an additional fuel canister and wherein the additional fuel canister is fluidically coupled to the engine and configured to flow desorbed evaporative emissions to the engine when purged. In an eighth example of the method, optionally including the first through seventh examples, drawing evaporative emissions from the components of the vehicle includes adjusting one or more of a throttle position, camshaft phasing, and crankshaft position prior to activating the vacuum pump.

The disclosure also provides support for a port-based emissions capture (PBEC) system for a vehicle, comprising: a plurality of vacuum ports disposed in surfaces of vehicle components, a vacuum pump fluidically coupled to the vehicle components by the plurality of vacuum ports, at least one fuel canister fluidically coupled to the vacuum pump, the at least one fuel canister configured to receive and store evaporative emissions from the vehicle components, and a controller including executable instructions for: upon detection of engine shutdown, operating the vacuum pump to draw evaporative emissions from the vehicle components into the at least one fuel canister. In a first example of the system, the system further comprises: adjusting a throttle to a closed position upon detection of engine shutdown. In a second example of the system, optionally including the first example, the system further comprises: phasing camshafts of the vehicle and rotating an engine of the vehicle to trap and push cylinder charge to the plurality of vacuum ports upon detection of engine shutdown. In a third example of the system, optionally including the first and second examples, operating the vacuum pump includes cycling the vacuum pump to evacuate the vehicle components until hydrocarbon levels at the vehicle components falls below a threshold level.

In another representation, a vehicle includes a fuel vapor purge (FVP) system coupled to a fuel tank and an engine system of the vehicle and an emissions-reducing system coupled to a fuel canister of the FVP system and to vehicle components prone to emitting hydrocarbon vapors, wherein the emissions-reducing system is configured to reduce emissions at the vehicle components via evacuation by a vacuum source. In a first example of the vehicle, the vehicle is a hybrid electric vehicle. A second example optionally includes the first example, and further includes, wherein the vehicle is one of a performance or heavy-duty vehicle.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A system for capturing evaporative emissions, comprising:
a plurality of vacuum ports disposed in hydrocarbon-emitting components of a vehicle, the plurality of vacuum ports fluidically coupled to a vacuum source configured to evacuate the hydrocarbon-emitting components and route evacuated evaporative emissions to an engine of the vehicle, wherein the vacuum source is activated to draw vacuum through each of the plurality of vacuum ports when the engine is not operating;
wherein the vacuum source is a first vacuum pump coupled to a second pump.

2. The system of claim 1, wherein the hydrocarbon-emitting components include one or more of an air induction system, an intake manifold, an exhaust manifold, and a charge air cooler.

3. The system of claim 1, wherein each of the plurality of vacuum ports is arranged in a respective surface of a respective hydrocarbon-emitting component and each of the hydrocarbon-emitting components is adapted with at least one of the plurality of vacuum ports.

4. The system of claim 1, wherein the second pump is positioned between the vacuum pump and at least one fuel canister, the second pump fluidically coupled to each of the vacuum pump and the at least one fuel canister and wherein the second pump is configured to pump evaporative emissions evacuated by the vacuum pump to the at least one fuel canister for storage.

5. The system of claim 4, wherein a first fuel canister of the at least one fuel canister is included in a fuel vapor purge system of the vehicle and wherein the first fuel canister is configured to deliver desorbed evaporative emissions to the engine when purged.

6. The system of claim 5, wherein a second fuel canister of the at least one fuel canister is coupled to both the vacuum pump and to the engine and wherein the second fuel canister is configured to store evaporative emissions evacuated by the vacuum pump and deliver desorbed evaporative emissions to the engine when purged.

7. A method for a port-based emissions capture system, comprising:
upon detection of engine shutdown,
activating a first, vacuum pump to draw evaporative emissions from components of a vehicle, the vacuum pump coupled to the components by vacuum ports and vacuum lines, into a fuel canister fluidically coupled to an engine of the vehicle; and
upon detection of engine startup,
deactivating the vacuum pump and purging the evaporative emissions from the fuel canister into the engines;
wherein drawing evaporative emissions from the components of the vehicle includes pumping evaporative emissions into an additional fuel canister and wherein the additional fuel canister is fluidically coupled to the engine and configured to flow desorbed evaporative emissions to the engine when purged.

8. The method of claim 7, wherein drawing evaporative emissions from the components into the fuel canister includes pumping the evaporative emissions via a second pump from the vacuum pump to the fuel canister.

9. The method of claim 7, wherein the vacuum pump is not activated when a request for refueling of a fuel tank of the vehicle is detected.

10. The method of claim 7, wherein drawing evaporative emissions from the components of the vehicle includes drawing evaporative emissions via vacuum ports arranged at the components, where the components of the vehicle are prone to evaporative emissions.

11. The method of claim 7, further including deactivating the vacuum pump when a request for engine startup is detected.

12. The method of claim 7, further including deactivating the vacuum pump when saturation of the fuel canister is detected.

13. The method of claim 7, further including deactivating the vacuum pump when measured hydrocarbon levels at each of the components of the vehicle are below a threshold level.

14. The method of claim 7, wherein drawing evaporative emissions from the components of the vehicle includes adjusting one or more of a throttle position, camshaft phasing, and crankshaft position prior to activating the vacuum pump.

15. A port-based emissions capture (PBEC) system for a vehicle, comprising:
a plurality of vacuum ports disposed in surfaces of vehicle components;
a vacuum pump fluidically coupled to the vehicle components by the plurality of vacuum ports;
at least one fuel canister fluidically coupled to the vacuum pump, the at least one fuel canister configured to receive and store evaporative emissions from the vehicle components; and
a controller including executable instructions for:
upon detection of engine shutdown,
operating the vacuum pump to draw evaporative emissions from the vehicle components into the at least one fuel canister; and
adjusting a throttle to a closed position.

16. The PBEC system of claim 15, further comprising phasing camshafts of the vehicle and rotating an engine of the vehicle to trap and push cylinder charge to the plurality of vacuum ports upon detection of engine shutdown.

17. The PBEC system of claim 15, wherein operating the vacuum pump includes cycling the vacuum pump to evacuate the vehicle components until hydrocarbon levels at the vehicle components falls below a threshold level.

\* \* \* \* \*